(12) United States Patent
Menyo et al.

(10) Patent No.: US 11,090,859 B2
(45) Date of Patent: Aug. 17, 2021

(54) CYANATE ESTER EPOXY DUAL CURE RESINS FOR ADDITIVE MANUFACTURING

(71) Applicant: Carbon, Inc., Redwood City, CA (US)

(72) Inventors: Matthew S. Menyo, San Francisco, CA (US); Jason P. Rolland, San Carlos, CA (US)

(73) Assignee: Carbon, Inc., Redwood City, CA (US)

( * ) Notice: Subject to any disclaimer, the term of this patent is extended or adjusted under 35 U.S.C. 154(b) by 29 days.

(21) Appl. No.: 16/576,862

(22) Filed: Sep. 20, 2019

(65) Prior Publication Data
US 2020/0023576 A1 Jan. 23, 2020

Related U.S. Application Data

(63) Continuation of application No. 15/754,086, filed as application No. PCT/US2016/050035 on Sep. 2, 2016, now Pat. No. 10,471,655.
(Continued)

(51) Int. Cl.
| | |
|---|---|
| *B29C 64/124* | (2017.01) |
| *C08G 73/06* | (2006.01) |
| *B29C 71/02* | (2006.01) |
| *B29C 71/04* | (2006.01) |
| *B33Y 70/00* | (2020.01) |

(Continued)

(52) U.S. Cl.
CPC .......... *B29C 64/124* (2017.08); *B29C 64/277* (2017.08); *B29C 71/02* (2013.01); *B29C 71/04* (2013.01); *B33Y 10/00* (2014.12); *B33Y 70/00* (2014.12); *C08G 73/0655* (2013.01); *C08G 73/0661* (2013.01); *B29K 2039/00* (2013.01); *B29K 2079/00* (2013.01)

(58) Field of Classification Search
CPC ............ C08G 73/0638; C08G 73/0644; C08G 73/065; C08G 73/0655; C08G 73/0661
See application file for complete search history.

(56) References Cited

U.S. PATENT DOCUMENTS

| | | |
|---|---|---|
| 3,448,079 A | 6/1969 | Grigat et al. |
| 4,116,946 A | 9/1978 | Jakob et al. |
| (Continued) | | |

FOREIGN PATENT DOCUMENTS

| | | |
|---|---|---|
| CN | 1241807 A | 1/2000 |
| CN | 103571211 | 2/2014 |
| (Continued) | | |

OTHER PUBLICATIONS

Chinese Office Action corresponding to CN 201680051002.0; dated Sep. 28, 2020 (8 pages, including English translation).
(Continued)

*Primary Examiner* — Benjamin A Schiffman
(74) *Attorney, Agent, or Firm* — Myers Bigel, P.A (57) ABSTRACT

A method of forming a three-dimensional object is carried out by: (a) providing a cyanate ester dual cure resin; (b) forming a three-dimensional intermediate from said resin, where said intermediate has the shape of, or a shape to be imparted to, said three-dimensional object, and where said resin is solidified by exposure to light; (c) optionally washing the three-dimensional intermediate, and then (d) heating and/or microwave irradiating said three-dimensional intermediate sufficiently to further cure said resin and form said three-dimensional object. Compositions useful for carrying out the method, and products made from the method, are also described.

19 Claims, 2 Drawing Sheets

*Cyanate Ester Trimerization.*

Related U.S. Application Data (60) Provisional application No. 62/270,635, filed on Dec. 22, 2015, provisional application No. 62/214,601, filed on Sep. 4, 2015.

(51) Int. Cl.
*B29C 64/277* (2017.01)
*B33Y 10/00* (2015.01)
*B29K 79/00* (2006.01)

(56) References Cited

U.S. PATENT DOCUMENTS

| | | | |
|---|---|---|---|
| 4,369,304 | A | 1/1983 | Gaku et al. |
| 4,371,689 | A | 2/1983 | Gaku et al. |
| 4,373,086 | A | 2/1983 | Ikeguchi |
| 4,383,903 | A | 5/1983 | Ayano et al. |
| 4,393,195 | A | 7/1983 | Gaku et al. |
| 4,600,760 | A | 7/1986 | Hefner, Jr. |
| 4,604,452 | A | 8/1986 | Shimp |
| 4,740,583 | A | 4/1988 | Brunelle et al. |
| 4,757,132 | A | 7/1988 | Brunelle et al. |
| 4,775,741 | A | 10/1988 | Brunelle et al. |
| 4,785,075 | A | 11/1988 | Shimp |
| 4,839,442 | A | 6/1989 | Craig, Jr. |
| 4,847,233 | A | 7/1989 | Shimp |
| 5,143,785 | A | 9/1992 | Pujol et al. |
| 5,236,637 | A | 8/1993 | Hull |
| 5,264,061 | A | 11/1993 | Juskey et al. |
| 5,466,744 | A | 11/1995 | Evans et al. |
| 5,494,981 | A | 2/1996 | Gorodisher et al. |
| 5,498,651 | A | 3/1996 | Brunelle |
| 5,543,516 | A | 8/1996 | Ishida |
| 5,629,133 | A | 5/1997 | Wolf et al. |
| 5,674,921 | A | 10/1997 | Regula et al. |
| 5,679,719 | A | 10/1997 | Klemarczyk et al. |
| 5,695,708 | A | 12/1997 | Karp et al. |
| 5,863,664 | A | 1/1999 | McCormick et al. |
| 6,207,786 | B1 | 3/2001 | Ishida et al. |
| 6,309,797 | B1 | 10/2001 | Grinevich et al. |
| 6,620,905 | B1 | 9/2003 | Musa |
| 6,632,893 | B2 | 10/2003 | Konarski et al. |
| 7,438,846 | B2 | 10/2008 | John |
| 7,892,474 | B2 | 2/2011 | Shkolnik et al. |
| 8,980,971 | B2 | 3/2015 | Ueda et al. |
| 9,205,601 | B2 | 12/2015 | Desimone et al. |
| 9,211,678 | B2 | 12/2015 | Desimone et al. |
| 9,216,546 | B2 | 12/2015 | Desimone et al. |
| 9,360,757 | B2 | 6/2016 | Desimone et al. |
| 9,453,142 | B2 | 9/2016 | Rolland et al. |
| 9,598,606 | B2 | 3/2017 | Rolland et al. |
| 9,676,963 | B2 | 6/2017 | Rolland et al. |
| 9,708,440 | B2 | 7/2017 | Das et al. |
| 9,777,097 | B2 | 10/2017 | Liu et al. |
| 9,873,761 | B1 | 1/2018 | Das et al. |
| 9,982,164 | B2 | 5/2018 | Rolland et al. |
| 10,016,938 | B2 | 7/2018 | Desimone et al. |
| 10,093,064 | B2 | 10/2018 | Desimone et al. |
| 10,144,181 | B2 | 12/2018 | Desimone et al. |
| 10,150,253 | B2 | 12/2018 | Desimone et al. |
| 10,155,882 | B2 | 12/2018 | Rolland et al. |
| 10,240,066 | B2 | 3/2019 | Rolland et al. |
| 2003/0091833 | A1 | 5/2003 | Baumgart et al. |
| 2004/0052966 | A1 | 3/2004 | Wilke et al. |
| 2004/0187714 | A1 | 9/2004 | Napadensky |
| 2007/0178133 | A1 | 8/2007 | Rolland |
| 2007/0205528 | A1 | 9/2007 | Patel et al. |
| 2008/0131692 | A1 | 6/2008 | Rolland et al. |
| 2010/0105794 | A1 | 4/2010 | Dietliker et al. |
| 2012/0195994 | A1 | 8/2012 | El-Siblani et al. |
| 2012/0251841 | A1 | 10/2012 | Southwell et al. |
| 2013/0292862 | A1 | 11/2013 | Joyce |
| 2013/0295212 | A1 | 11/2013 | Chen et al. |
| 2014/0335341 | A1 | 11/2014 | Park et al. |
| 2015/0072293 | A1 | 3/2015 | Desimone et al. |
| 2015/0097316 | A1 | 4/2015 | Desimone et al. |
| 2015/0322291 | A1 | 11/2015 | Salviato et al. |
| 2016/0160077 | A1 | 6/2016 | Rolland et al. |
| 2017/0151718 | A1 | 6/2017 | Rolland et al. |
| 2017/0239887 | A1 | 8/2017 | Rolland et al. |
| 2018/0265738 | A1 | 9/2018 | Rolland et al. |

FOREIGN PATENT DOCUMENTS

| | | |
|---|---|---|
| EP | 0442071 | 8/1991 |
| EP | 0525578 | 2/1993 |
| EP | 0830641 | 3/1998 |
| EP | 0945755 | 9/1999 |
| EP | 0945744 | 4/2001 |
| EP | 1341039 | 9/2003 |
| EP | 1918316 | 5/2008 |
| EP | 2224874 | 9/2010 |
| JP | H02111528 | 4/1990 |
| JP | H0948915 A | 2/1997 |
| WO | 2001/026023 | 4/2001 |
| WO | 2003/033212 | 4/2003 |
| WO | 2006/045002 | 4/2006 |
| WO | 2015/077419 | 5/2015 |
| WO | 2016/126779 | 8/2016 |

OTHER PUBLICATIONS

Japanese Office Action corresponding to JP 2018-511267; dated Aug. 25, 2020 (7 pages, including English translation).
Chinese Office Action corresponding to CN 201680051002.0; dated Dec. 18, 2020 (17 pages, including English translation).
Bauer et al., "Cyanete ester based resin systems for snap-cure applications" Microsystem Technologies, 8:58-62 (2002) Abstract.
Brunelle, D. "Cyclic Oligomer Chemistry" J. Polymer Science, 46:1151-1164 (2008).
Hamerton et al. "A study of the polymerization of novel cyanate ester/acrylate blends" Polymer 41(5):1647-1656 (2000) Abstract.
International Search Report and Written Opinion for PCT/US2016/050035 dated Jan. 18, 2017, 10 pages.
Malik et al. "A thermally reworkable UV curable acrylic adhesive prototype" International Journal of Adhesion & Adhesives, 22: 283-289 (2002).
Malik et al. "Comparative Study of Novel Polymer Prototype for Controlled Thermally Reworkable UV Curable Acrylic Adhesives in Absence and Presence of Reactive Diluent" Surface Engineering, 19(2): 121-126 (2003).
Malik et al. "Computational study of thermally controlled polymer network disassembly via the incorporation of sterically hindered urea linkages" Polymer, 43: 2561-2567 (2002).
Malik et al. "The thermally controlled molecular disassembly properties of a polymer network via the incorporation of one sterically hindered urea linkage" Polymer Degradation and Stability, 76: 241-249 (2002).
Malik et al., "Thermally Controlled Molecular Disassembly of a Crosslinked Polymer Network by the Incorporation of Sterically Hindered Urea Linkages" Journal of Applied Polymer Science, 85: 856-864 (2002).
Pan et al. "A Fast Mask Projection Stereolithography Process for Fabricating Digital Models in Minutes", J. Manufacturing Sci. and Eng. 134(5):051011-1 (2012).
Park et al. "UV- and thermal-curing behaviors or dual-curable adhesives based on epoxy acrylate oligomers" International Journal of Adhesion and Adhesives, 29(7): 710-717 (2009).
Tumbleston et al. "Continuous liquid interface production of 3D Objects" Science, 347(6228):1349-1352 (2015).
Tumbleston et al. Supplementary materials "Continuous liquid interface production of 3D Objects" Science, 347(6228):1349-1352 (2015).
Velankar et al. "High-Performance UV-Curable Urethane Acrylates via Deblocking Chemistry" Journal of Applied Polymer Science, 162:1361-1376 (1996).
Japanese Office Action corresponding to JP2018-511267; dated Apr. 27, 2021 (5 pages, including English translation).

Figure 1. Cyanate Ester Trimerization.

Figure 2. Dual cure of UV-curable network and cyanate ester network.

*Figure 3. Impeller produced from dual cure cyanate ester resin.*

CYANATE ESTER EPOXY DUAL CURE RESINS FOR ADDITIVE MANUFACTURING

RELATED APPLICATIONS

This application is a continuation of U.S. patent application Ser. No. 15/754,086, filed Feb. 21, 2018, which is a 35 U.S.C. § 371 national phase application of International Application Serial No. PCT/US2016/050035, filed Sep. 2, 2016, which claims the benefit of U.S. Provisional Patent Application Ser. No. 62/214,601, filed Sep. 4, 2015, and of U.S. Provisional Patent Application Ser. No. 62/270,635, filed Dec. 22, 2015, the disclosures of which are incorporated by reference herein in their entirety.

FIELD OF THE INVENTION

The present invention concerns materials, methods and apparatus for the fabrication of solid three-dimensional objects from liquid materials, and objects so produced.

BACKGROUND OF THE INVENTION

In conventional additive or three-dimensional fabrication techniques, construction of a three-dimensional object is performed in a step-wise or layer-by-layer manner. In particular, layer formation is performed through solidification of photo curable resin under the action of visible or UV light irradiation. Two techniques are known: one in which new layers are formed at the top surface of the growing object; the other in which new layers are formed at the bottom surface of the growing object. An early example is Hull, U.S. Pat. No. 5,236,637. Other approaches are shown in U.S. Pat. Nos. 7,438,846, 7,892,474; M. Joyce, US Patent App. 2013/0292862; Y. Chen et al., US Patent App. 2013/0295212 (both Nov. 7, 2013); Y. Pan et al., *J. Manufacturing Sci. and Eng.* 134, 051011-1 (October 2012), and numerous other references. Materials for use in such apparatus are generally limited, and there is a need for new resins which will provide diverse material properties for different product families if three-dimensional fabrication is to achieve its full potential.

Southwell, Xu et al., US Patent Application Publication No. 2012/0251841, describe liquid radiation curable resins for additive fabrication, but these comprise a cationic photoinitiator (and hence are limited in the materials which may be used) and are suggested only for layer by layer fabrication. See also U.S. Pat. No. 8,980,971 to Ueda (DSM).

Velankar, Pazos, and Cooper, *Journal of Applied Polymer Science* 162, 1361 (1996), describe UV-curable urethane acrylates formed by a deblocking chemistry, but they are not suggested for additive manufacturing, and no suggestion is made on how those materials may be adapted to additive manufacturing.

Cyanate esters are an important class of high-temperature thermosets used in aerospace, computing, and other industries. These materials have extremely high glass transition temperatures (up to 400° C.), high tensile strength, high modulus, and low dielectric constant, dielectric loss and moisture uptake. The materials are low-viscosity liquids, semi-solids, and solids that are thermally cured at elevated temperatures and have heretofore been considered therefore incompatible with traditional 3D printing (or so called additive manufacturing methods on their own).

SUMMARY OF THE INVENTION

We address the aforesaid issues by, in general, blending cyanate esters with UV-curable oligomers and reactive diluents. Herein, a curable resin incorporating a radiation-cured network and a heat-cured thermoset consisting of a cyanate ester is described. This resin allows the creation of 3D printed parts. These parts exhibit desirable mechanical properties (ultimate tensile strength, modulus), desirable thermal properties (heat deflection temperature, glass transition temperature, degradation temperature, low thermal shrinkage), and/or desirable dielectric properties (low dielectric constant, low dielectric loss).

Accordingly, described herein is a method of forming a three-dimensional object is described herein. The method generally comprises:

(a) providing a cyanate ester dual cure resin (also referred to herein as a "polymerizable liquid");

(b) forming a three-dimensional intermediate from said resin, where said intermediate has the shape of, or a shape to be imparted to, said three-dimensional object, and where said resin is solidified by exposure to light;

(c) optionally, but in some embodiments preferably, washing the three dimensional intermediate, and then (d) heating and/or microwave irradiating said three-dimensional intermediate sufficiently to further cure said resin and form said three-dimensional object;

wherein said cyanate ester dual cure resin comprises:
(i) a photoinitiator;
(ii) monomers and/or prepolymers that are polymerizable by exposure to actinic radiation or light;
(iii) optionally, a light absorbing pigment or dye;
(iv) optionally, a metal catalyst;
(v) optionally, a nucleophilic co-catalyst;
(vi) at least one cyanate ester compound, and/or a prepolymer thereof (e.g., a homoprepolymer and/or heteroprepolymer thereof), each said cyanate ester compound independently having a structure of Formula I:

wherein m is 2, 3, 4, or 5, and R is an aromatic or aliphatic (e.g., C5 to C12 cycloaliphatic) group;
(vii) optionally a diluent (including reactive diluents);
(viii) optionally a filler (e.g., silica, a toughener such as a core-shell rubber, etc., including combinations thereof); and
(ix) optionally, a co-monomer and/or a co-prepolymer (e.g., co-polymerizable with the aforesaid cyanate ester compound and/or prepolymer thereof).

Resins useful for carrying out such methods, and products produced from such methods, are also described.

In some embodiments, a Lewis acid or an oxidizable tin salt is included in the polymerizable liquid or resin (e.g., in an amount of from 0.01 or 0.1 to 1 or 2 percent by weight, or more) in an amount effective to accelerate the formation of the three-dimensional intermediate object during the production thereof.

In some embodiments of the methods and compositions described above and below, the polymerizable liquid (or "dual cure resin") has a viscosity of 100, 200, 500 or 1,000 centipoise or more at room temperature and/or under the operating conditions of the method, up to a viscosity of 10,000, 20,000, or 50,000 centipoise or more, at room temperature and/or under the operating conditions of the method.

The resins and methods described herein are particularly useful for forming three-dimensional objects that must be strong and stiff, and/or heat tolerant.

In some embodiments, polymerizable liquids used in the present invention include a non-reactive pigment or dye. Examples include, but are not limited to, (i) titanium dioxide (e.g., in an amount of from 0.05 or 0.1 to 1 or 5 percent by weight), (ii) carbon black (e.g., included in an amount of from 0.05 or 0.1 to 1 or 5 percent by weight), and/or (iii) an organic ultraviolet light absorber such as a hydroxybenzophenone, hydroxyphenylbenzotriazole, oxanilide, benzophenone, thioxanthone, hydroxyphenyltriazine, and/or benzotriazole ultraviolet light absorber (e.g. in an amount of 0.001 or 0.005 to 1, 2 or 4 percent by weight).

Non-limiting examples and specific embodiments of the present invention are explained in greater detail in the specification set forth below. The disclosures of all United States Patent references cited herein are to be incorporated herein by reference in their entirety.

DETAILED DESCRIPTION OF ILLUSTRATIVE EMBODIMENTS

The present invention is now described more fully hereinafter with reference to the accompanying drawings, in which embodiments of the invention are shown. This invention may, however, be embodied in many different forms and should not be construed as limited to the embodiments set forth herein; rather these embodiments are provided so that this disclosure will be thorough and complete and will fully convey the scope of the invention to those skilled in the art.

As used herein, the term "and/or" includes any and all possible combinations or one or more of the associated listed items, as well as the lack of combinations when interpreted in the alternative ("or").

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and claims and should not be interpreted in an idealized or overly formal sense unless expressly so defined herein. Well-known functions or constructions may not be described in detail for brevity and/or clarity.

"Shape to be imparted to" refers to the case where the shape of the intermediate object slightly changes between formation thereof and forming the subsequent three-dimensional product, typically by shrinkage (e.g., up to 1, 2 or 4 percent by volume), expansion (e.g., up to 1, 2 or 4 percent by volume), removal of support structures, or by intervening forming steps (e.g., intentional bending, stretching, drilling, grinding, cutting, polishing, or other intentional forming after formation of the intermediate product, but before formation of the subsequent three-dimensional product).

1. Resins.

As noted above, the present invention includes cyanate ester dual cure resin compositions useful for additive manufacturing. Such compositions comprise, consist of, or consist essentially of:
(i) a photoinitiator (e.g., a free-radical polymerization photoinitiator, including combinations thereof, particularly Ultraviolet light (UV) photoinitiators);
(ii) monomers and/or prepolymers that are polymerizable by exposure to actinic radiation or light (when in combination with said photoinitiator);
(iii) optionally, a light absorbing pigment or dye;
(iv) optionally, a metal catalyst;
(v) optionally, a nucleophilic co-catalyst;
(vi) at least one cyanate ester compound, and/or a prepolymer thereof (e.g., a homoprepolymer and/or heteroprepolymer thereof), each said cyanate ester compound independently having a structure of Formula I:

$$R \!-\!\!\left(\!O\!-\!C\!\equiv\!N\right)_m \qquad (I)$$

wherein m is 2, 3, 4, or 5, and R is an aromatic or aliphatic (e.g., C5 to C12 cycloaliphatic) group;
(vii) optionally a diluent (including reactive diluents);
(viii) optionally a filler (e.g., silica); and
(ix) optionally, a co-monomer and/or a co-prepolymer (e.g., co-polymerizable with the aforesaid cyanate ester compound and/or prepolymer thereof).

In some embodiments of the foregoing, R is a phenyl, naphthyl, anthryl, phenanthryl, or pyrenyl group (unsubstituted, or optionally substituted). (See, e.g., U.S. Pat. No. 3,448,079).

In some embodiments of the foregoing, R is a phenyl, biphenyl, naphthyl, bis(phenyl)methane, bis(phenyl)ethane, bis(phenyl)propane, bis(phenyl)butane, bis(phenyl)ether, bis(phenyl)thioether, bis(phenyl)sulfone, bis(phenyl) phosphine oxide, bis(phenyl)silane, bis(phenyl)hexafluoropropane, bis(phenyl)trifluoroethane, or bis(phenyl)dicyclopentadiene group, or a phenol formaldehyde resin, (optionally substituted from 1 or 2 to 4 or 6 times with, for example, C1-C4 alkyl, C1-C4 alkoxy, halo, etc. (See, e.g., US Patent Application Publication No. 20140335341).

In some embodiments, the cyanate ester compound is selected from the group consisting of: 1,3-, or 1,4-dicyanatobenzene; 1,3,5-tricyanatobenzene; 1,3-, 1,4-, 1,6-, 1,8-, 2,6- or 2,7-dicyanatonaphthalene; 1,3,6-tricyanatoaphthalene; 2,2' or 4,4'-dicyanatobiphenyl; bis(4-cyanathophenyl) methane; 2,2-bis(4-cyanatophenyl) propane; 2,2-bis(3,5-dichloro-4-cyanatophenyl)propane, 2,2-bis(3-dibromo-4-dicyanatophenyl)propane; bis(4-cyanatophenyl)ether; bis(4-cyanatophenyl)thioether; bis(4-cyanatophenyl)sulfone; tris (4-cyanatophenyl)phosphite; tris(4-cyanatophenyl) phosphate; bis(3-chloro-4-cyanatophenyl)methane; 4-cyanatobiphenyl; 4-cumylcyanatobenzene; 2-tert-butyl-1, 4-dicyanatobenzene; 2,4-dimethyl-1,3-dicyanatobenzene; 2,5-di-tert-butyl-1,4 dicyanatobenzene; tetramethyl-1,4-dicyanatobenzene; 4-chloro-1,3-dicyanatobenzene; 3,3',5,5'-tetramethyl-4,4' dicyanatodiphenylbis(3-chloro-4-cyanatophenyl)methane; 1,1,1-tris(4-cyanatophenyl)ethane; 1,1-bis (4-cyanatophenyl)ethane; 2,2-bis(3,5-dichloro-4-cyanatophenyl)propane; 2,2-bis(3,5 dibromo-4-cyanatophenyl)propane; bis(p-cyanophenoxyphenoxy) benzene; di(4-cyanatophenyl)ketone; cyanated novolacs produced by reacting a novolac with cyanogen halide; cyanated bisphenol polycarbonate oligomers produced by reacting a bisphenol polycarbonate oligomer with cyanogen halide; and mixtures thereof. (see, e.g., U.S. Pat. No. 4,371,689).

In some embodiments of the foregoing, said metal catalyst is a chelate or oxide of a metal selected from the group consisting of divalent copper, zinc, manganese, tin, lead, cobalt and nickel, trivalent iron, cobalt, manganese and aluminum, and tetravalent titanium (See, e.g., U.S. Pat. Nos. 4,785,075; 4,604,452; and 4,847,233).

In some embodiments, the said metal catalyst is a metal salt of an organic acid of at least one metal selected from the group consisting of copper, zinc, lead, nickel, iron, tin and cobalt.

In some embodiments, the metal catalyst is present in the range of 10 or 30 to 600, 1,00, or 10,000 microequivalents of said metal catalyst as compared to the total weight of said at least one cyanate ester or prepolymer thereof.

In some embodiments, the nucleophilic co-catalyst is an alkylphenol or imidazole present in the amount of 2 or 5 to 60 or 100 milliequivalents of active hydrogen per equivalent of cyanate ester group.

In some embodiments, the nucleophilic co-catalyst is selected from the group consisting of nonylphenol, dodecylphenol, o-cresol, 2-sec.butylphenol and 2,6 dinonylphenol, 2-methylimidazole, 2-undecylimidazole, 2-heptadecyl imidazole, 2-phenylimidazole, 2-ethyl 4-methylimidazole, 1-benzyl-2-methylimidazole, 1-propyl-2-methylimidazole, 1-cyanoethyl-2-methylimidazole, 1-cyanoethyl-2-ethyl-4-methylimidazole, 1-cyanoethyl-2-undecylimidazole, 1-cyanoethyl-2-phenylimidazole, or 1-guanaminoethyl-2-methylimidazole, or water (including adventitious water absorption). (See, e.g., U.S. Pat. No. 4,371,689)

In some embodiments, the nucleophilic co-catalyst is a component of the monomers and/or prepolymers, present in the amount of about 10 or 40 to about 400 or 800 milliequivalents of active hydrogen per equivalent of cyanate group.

In some embodiments, the nucleophilic co-catalyst is absent (as a separate chemical entity) and wherein said monomers and/or prepolymers contain urethane, urea, and/or phenolic groups (and hence serves as an intrinsic nucleophilic co-catalyst).

In some embodiments, the monomers and/or prepolymers polymerizable by exposure to actinic radiation or light comprising reactive end groups selected from the group consisting of acrylates, methacrylates, α-olefins, N-vinyls, acrylamides, methacrylamides, styrenics, epoxides, thiols, 1,3-dienes, vinyl halides, acrylonitriles, vinyl esters, maleimides, and vinyl ethers. (See, e.g., US Patent Application Publication No. 2015/0072293 to DeSimone et al).

Any suitable co-monomer and/or prepolymer thereof that is polymerizable with the cyanate ester (or prepolymer thereof) may optionally be used in the present invention, including but not limited to amine, epoxy, phenol, bismaleimide, and benzoxazine co-monomers, and/or co-prepolymers thereof. See, e.g., J. Bauer and M. Bauer, Cyanate ester based resin systems for snap-cure applications, *Microsystem Technologies* 8, 58-62 (2002).

Examines of suitable benzoxazine co-monomers and/or co-prepolymers include, but are not limited to, benzoxazines derived from the reaction of formaldehyde and either aniline or methylamine with 2,2-bis(4-hydroxyphenyl)propane (bisphenol A), 2,2-bis(4-hydroxyphenyl)methane (bisphenol F), 4,4' thiodiphenol. See also U.S. Pat. Nos. 6,207,786, 5,543,516 and 6,620,905. Such benzoxazines may be incorporated into the composition in any suitable amount, such as from 0.1 or 5 percent by weight to 30 or 49 percent by weight.

Any suitable filler may be used in connection with the present invention, depending on the properties desired in the part or object to be made. Thus, fillers may be solid or liquid, organic or inorganic, and may include reactive and non-reactive rubbers: siloxanes, acrylonitrile-butadiene rubbers; reactive and non-reactive thermoplastics (including but not limited to: poly(ether imides), maleimide-styrene terpolymers, polyarylates, polysulfones and polyethersulfones, etc.) inorganic fillers such as silicates (such as talc, clays, silica, mica), glass, carbon nanotubes, graphene, cellulose nanocrystals, etc., including combinations of all of the foregoing.

In some embodiments, the light absorbing pigment or dye is:
(i) titanium dioxide (e.g., in an amount of from 0.05 or 0.1 to 1 or 5 percent by weight),
(ii) carbon black (e.g., in an amount of from 0.05 or 0.1 to 1 or 5 percent by weight), and/or
(iii) an organic ultraviolet light absorber (e.g., a hydroxybenzophenone, hydroxyphenylbenzotriazole, oxanilide, benzophenone, thioxanthone, hydroxyphenyltriazine, and/or benzotriazole ultraviolet light absorber) (e.g., in an amount of 0.001 or 0.005 to 1 or 2 percent by weight).

In some embodiments, the diluent comprises an acrylate, a methacrylate, a styrene, an acrylic acid, a vinylamide, a vinyl ether, a vinyl ester, polymers containing any one or more of the foregoing, and combinations of two or more of the foregoing.

In some embodiments, the resin/polymerizable liquid comprises:
(i) from 0.1 to 4 percent by weight of said photoinitiator,
(ii) from 10 to 90 percent by weight of said monomers and/or prepolymers that are polymerizable by exposure to actinic radiation or light,
(iii) from 0.1 to 2 percent by weight of said light absorbing pigment or dye when present,
(iv) from 0.001 to 0.1 percent by weight of said metal catalyst when present;
(v) from 0.1 to 10 percent by weight of said nucleophilic co-catalyst when present;
(vi) from 10 to 90 percent by weight of said cyanate ester compound and/or prepolymer thereof;
(vii) from 1 to 40 percent by weight of said reactive diluents when present;
(viii) from 1 to 50 percent by weight of said filler when present; and
(ix) from 0.1, 1 or 5 to 20, 40 or 50 percent by weight of a co-monomer and/or a co-prepolymer when present.

Cyanate Ester Prepolymers.

In some embodiments, some or all of the cyanate ester compound(s) may be included in the composition in the form of prepolymers thereof. In some embodiments, the inclusion of such prepolymers can improve the properties of the three-dimensional object being produced, such as by reducing thermal shrinkage, reducing sweating, and/or reducing cracking during the second curing step, without substantially adversely affecting the properties of the final product. Examples of such prepolymers include, but are not limited to, those based on 2,2-bis(4-hydroxyphenyl)propane dicyanate (bisphenol A dicyanate), 2,2-bis(4-hydroxyphenyl)ethane dicyanate (bisphenol E dicyanate), and cyanated novolacs. All of the cyanate ester content of the composition may be provided in the form of prepolymers, or some of the cyanate ester content of the composition may be provided in the form of prepolymers (e.g., in a weight ratio of cyanate ester monomer(s) to cyanate prepolymer(s) of from 1:100 or 1:10 to 100:1 or 10:1).

In some embodiments, these prepolymers comprise, consist of, or consist essentially of the reaction product of cyanate ester monomers reacted to degrees of conversion of the cyanate groups of from 1 or 5 percent to 20 or 40 percent (of initial cyanate functionality, group or substituents), leading to prepolymers with molecular weights of from 200 or 400 g/mol to 4,000 or 8,000 g/mol.

In some embodiments, a Lewis acid or an oxidizable tin salt is included in the polymerizable liquid (e.g., in an amount of from 0.01 or 0.1 to 1 or 2 percent by weight, or more) in an amount effective to accelerate the formation of the three-dimensional intermediate object during the production thereof. Oxidizable tin salts useful for carrying out the present invention include, but are not limited to, stannous butanoate, stannous octoate, stannous hexanoate, stannous heptanoate, stannous linoleate, stannous phenyl butanoate, stannous phenyl stearate, stannous phenyl oleate, stannous nonanoate, stannous decanoate, stannous undecanoate, stannous dodecanoate, stannous stearate, stannous oleate stannous undecenoate, stannous 2-ethylhexoate, dibutyl tin dilaurate, dibutyl tin dioleate, dibutyl tin distearate, dipropyl tin dilaurate, dipropyl tin dioleate, dipropyl tin distearate, dibutyl tin dihexanoate, and combinations thereof. See also U.S. Pat. Nos. 5,298,532; 4,421,822; and 4,389,514, the disclosures of which are incorporated herein by reference. In addition to the foregoing oxidizable tin salts, Lewis acids such as those described in Chu et al. in Macromolecular Symposia, Volume 95, Issue 1, pages 233-242, June 1995 are known to enhance the polymerization rates of free-radical polymerizations and are included herein by reference.

Any suitable filler may be used in connection with the present invention, depending on the properties desired in the part or object to be made. Thus, fillers may be solid or liquid, organic or inorganic, and may include reactive and non-reactive rubbers: siloxanes, acrylonitrile-butadiene rubbers; reactive and non-reactive thermoplastics (including but not limited to: poly(ether imides), maleimide-styrene terpolymers, polyarylates, polysulfones and polyethersulfones, etc.) inorganic fillers such as silicates (such as talc, clays, silica, mica), glass, carbon nanotubes, graphene, cellulose nanocrystals, etc., including combinations of all of the foregoing. Suitable fillers include tougheners, such as core-shell rubbers, as discussed below.

Tougheners.

One or more polymeric and/or inorganic tougheners can be used as a filler in the present invention. See generally US Patent Application Publication No. 20150215430. The toughener may be uniformly distributed in the form of particles in the cured product. The particles could be less than 5 microns (um) in diameter. Such tougheners include, but are not limited to, those formed from elastomers, branched polymers, hyperbranched polymers, dendrimers, rubbery polymers, rubbery copolymers, block copolymers, core-shell particles, oxides or inorganic materials such as clay, polyhedral oligomeric silsesquioxanes (POSS), carbonaceous materials (e.g., carbon black, carbon nanotubes, carbon nanofibers, fullerenes), ceramics and silicon carbides, with or without surface modification or functionalization. Examples of block copolymers include the copolymers whose composition is described in U.S. Pat. No. 6,894,113 (Court et al., Atofina, 2005) and include "NANOSTRENTH®™" SBM (polystyrene-polybutadiene-polymethacrylate), and AMA (polymethacrylate-polybutylacrylate-polymethacrylate), both produced by Arkema. Other suitable block copolymers include FORTEGRA®™ and the amphiphilic block copolymers described in U.S. Pat. No. 7,820,760B2, assigned to Dow Chemical. Examples of known core-shell particles include the core-shell (dendrimer) particles whose compositions are described in US20100280151A1 (Nguyen et al., Toray Industries, Inc., 2010) for an amine branched polymer as a shell grafted to a core polymer polymerized from polymerizable monomers containing unsaturated carbon-carbon bonds, core-shell rubber particles whose compositions are described in EP 1632533A1 and EP 2123711A1 by Kaneka Corporation, and the "KaneAce MX" product line of such particle/epoxy blends whose particles have a polymeric core polymerized from polymerizable monomers such as butadiene, styrene, other unsaturated carbon-carbon bond monomer, or their combinations, and a polymeric shell compatible with the epoxy, typically polymethylmethacrylate, polyglycidylmethacrylate, polyacrylonitrile or similar polymers, as discussed further below. Also suitable as block copolymers in the present invention are the "JSR SX" series of carboxylated polystyrene/polydivinylbenzenes produced by JSR Corporation; "Kureha Paraloid" EXL-2655 (produced by Kureha Chemical Industry Co., Ltd.), which is a butadiene alkyl methacrylate styrene copolymer; "Stafiloid" AC-3355 and TR-2122 (both produced by Takeda Chemical Industries, Ltd.), each of which are acrylate methacrylate copolymers; and "PARALOID" EXL-2611 and EXL-3387 (both produced by Rohm & Haas), each of which are butyl acrylate methyl methacrylate copolymers. Examples of suitable oxide particles include NANOPOX™ produced by nanoresins AG. This is a master blend of functionalized nanosilica particles and an epoxy.

Core-Shell Rubbers.

Core-shell rubbers are particulate materials (particles) having a rubbery core. Such materials are known and described in, for example, US Patent Application Publication No. 20150184039, as well as US Patent Application Publication No. 20150240113, and U.S. Pat. Nos. 6,861,475, 7,625,977, 7,642,316, 8,088,245, and elsewhere.

In some embodiments, the core-shell rubber particles are nanoparticles (i.e., having an average particle size of less than 1000 nanometers (nm)). Generally, the average particle size of the core-shell rubber nanoparticles is less than 500 nm, e.g., less than 300 nm, less than 200 nm, less than 100 nm, or even less than 50 nm. Typically, such particles are spherical, so the particle size is the diameter; however, if the particles are not spherical, the particle size is defined as the longest dimension of the particle.

In some embodiments, the rubbery core can have a Tg of less than $-25°$ C., more preferably less than $-50°$ C., and even more preferably less than $-70°$ C. The Tg of the rubbery core may be well below $-100°$ C. The core-shell rubber also has at least one shell portion that preferably has a Tg of at least $50°$ C. By "core," it is meant an internal portion of the core-shell rubber. The core may form the center of the core-shell particle, or an internal shell or domain of the core-shell rubber. A shell is a portion of the core-shell rubber that is exterior to the rubbery core. The shell portion (or portions) typically forms the outermost portion of the core-shell rubber particle. The shell material can be grafted onto the core or is cross-linked. The rubbery core may constitute from 50 to 95%, or from 60 to 90%, of the weight of the core-shell rubber particle.

The core of the core-shell rubber may be a polymer or copolymer of a conjugated diene such as butadiene, or a lower alkyl acrylate such as n-butyl-, ethyl-, isobutyl- or 2-ethylhexylacrylate. The core polymer may in addition contain up to 20% by weight of other copolymerized mono-unsaturated monomers such as styrene, vinyl acetate, vinyl chloride, methyl methacrylate, and the like. The core polymer is optionally cross-linked. The core polymer optionally contains up to 5% of a copolymerized graft-linking monomer having two or more sites of unsaturation of unequal reactivity, such as diallyl maleate, monoallyl fumarate, allyl methacrylate, and the like, at least one of the reactive sites being non-conjugated.

The core polymer may also be a silicone rubber. These materials often have glass transition temperatures below −100° C. Core-shell rubbers having a silicone rubber core include those commercially available from Wacker Chemie, Munich, Germany, under the trade name Genioperl.

The shell polymer, which is optionally chemically grafted or cross-linked to the rubber core, can be polymerized from at least one lower alkyl methacrylate such as methyl methacrylate, ethyl methacrylate or t-butyl methacrylate. Homopolymers of such methacrylate monomers can be used. Further, up to 40% by weight of the shell polymer can be formed from other monovinylidene monomers such as styrene, vinyl acetate, vinyl chloride, methyl acrylate, ethyl acrylate, butyl acrylate, and the like. The molecular weight of the grafted shell polymer can be between 20,000 and 500,000.

One suitable type of core-shell rubber has reactive groups in the shell polymer which can react with an epoxy resin or an epoxy resin hardener. Glycidyl groups are suitable. These can be provided by monomers such as glycidyl methacrylate.

One example of a suitable core-shell rubber is of the type described in US Patent Application Publication No. 2007/0027233 (EP 1 632 533 A1). Core-shell rubber particles as described therein include a cross-linked rubber core, in most cases being a cross-linked copolymer of butadiene, and a shell which is preferably a copolymer of styrene, methyl methacrylate, glycidyl methacrylate and optionally acrylonitrile. The core-shell rubber is preferably dispersed in a polymer or an epoxy resin, also as described in the document.

Suitable core-shell rubbers include, but are not limited to, those sold by Kaneka Corporation under the designation Kaneka Kane Ace, including the Kaneka Kane Ace 15 and 120 series of products, including Kanaka Kance Ace MX 120, Kaneka Kane Ace MX 153, Kaneka Kane Ace MX 154, Kaneka Kane Ace MX 156, Kaneka Kane Ace MX170, and Kaneka Kane Ace MX 257 and Kaneka Kane Ace MX 120 core-shell rubber dispersions, and mixtures thereof.

Stabilizers.

In some embodiments, the shelf life of the resin, and/or the pot life of the resin during production of an object, may be extended by including a stabilizer in the resin, typically in an amount of from about 0.001 or 0.01 percent by weight, up to 0.1, 0.5, or 1 percent by weight. Suitable stabilizers include, but are not limited to, acids having a pKa below 2, such as p-toluene sulfonic acid, polyphosphoric acid esters, etc. See, e.g., U.S. Pat. No. 4,839,442.

2. Methods.

The three dimensional intermediate is preferably formed from resins as described above by additive manufacturing, typically bottom-up or top-down additive manufacturing. Such methods are known and described in, for example, U.S. Pat. No. 5,236,637 to Hull, U.S. Pat. Nos. 5,391,072 and 5,529,473 to Lawton, U.S. Pat. No. 7,438,846 to John, U.S. Pat. No. 7,892,474 to Shkolnik, U.S. Pat. No. 8,110,135 to El-Siblani, U.S. Patent Application Publication Nos. 2013/0292862 to Joyce and 2013/0295212 to Chen et al., and PCT Application Publication No. WO 2015/164234 to Robeson et al. The disclosures of these patents and applications are incorporated by reference herein in their entirety.

In general, top-down three-dimensional fabrication is carried out by:

(a) providing a polymerizable liquid reservoir having a polymerizable liquid fill level and a carrier positioned in the reservoir, the carrier and the fill level defining a build region therebetween;

(b) filling the build region with a polymerizable liquid (i.e., the resin), said polymerizable liquid comprising a mixture of (i) a light (typically ultraviolet light) polymerizable liquid first component, and (ii) a second solidifiable component of the dual cure system; and then (c) irradiating the build region with light to form a solid polymer scaffold from the first component and also advancing (typically lowering) the carrier away from the build surface to form a three-dimensional intermediate having the same shape as, or a shape to be imparted to, the three-dimensional object and containing said second solidifiable component (e.g., a second reactive component) carried in the scaffold in unsolidified and/or uncured form.

A wiper blade, doctor blade, or optically transparent (rigid or flexible) window, may optionally be provided at the fill level to facilitate leveling of the polymerizable liquid, in accordance with known techniques. In the case of an optically transparent window, the window provides a build surface against which the three dimensional intermediate is formed, analogous to the build surface in bottom-up three dimensional fabrication as discussed below.

In general, bottom-up three dimensional fabrication is carried out by:

(a) providing a carrier and an optically transparent member having a build surface, the carrier and the build surface defining a build region therebetween;

(b) filling the build region with a polymerizable liquid (i.e., the resin), said polymerizable liquid comprising a mixture of (i) a light (typically ultraviolet light) polymerizable liquid first component, and (ii) a second solidifiable component of the dual cure system; and then (c) irradiating the build region with light through said optically transparent member to form a solid polymer scaffold from the first component and also advancing (typically raising) the carrier away from the build surface to form a three-dimensional intermediate having the same shape as, or a shape to be imparted to, the three-dimensional object and containing said second solidifiable component (e.g., a second reactive component) carried in the scaffold in unsolidified and/or uncured form.

In some embodiments of bottom up or top down three dimensional fabrication as implemented in the context of the present invention, the build surface is stationary during the formation of the three dimensional intermediate; in other embodiments of bottom-up three dimensional fabrication as implemented in the context of the present invention, the build surface is tilted, slid, flexed and/or peeled, and/or otherwise translocated or released from the growing three dimensional intermediate, usually repeatedly, during formation of the three dimensional intermediate.

In some embodiments of bottom up or top down three dimensional fabrication as carried out in the context of the present invention, the polymerizable liquid (or resin) is maintained in liquid contact with both the growing three dimensional intermediate and the build surface during both the filling and irradiating steps, during fabrication of some of, a major portion of, or all of the three dimensional intermediate.

In some embodiments of bottom-up or top down three dimensional fabrication as carried out in the context of the present invention, the growing three dimensional intermediate is fabricated in a layerless manner (e.g., through multiple exposures or "slices" of patterned actinic radiation or light) during at least a portion of the formation of the three dimensional intermediate.

In some embodiments of bottom up or top down three dimensional fabrication as carried out in the context of the present invention, the growing three dimensional intermediate is fabricated in a layer-by-layer manner (e.g., through multiple exposures or "slices" of patterned actinic radiation or light), during at least a portion of the formation of the three dimensional intermediate.

In some embodiments of bottom up or top down three dimensional fabrication employing a rigid or flexible optically transparent window, a lubricant or immiscible liquid may be provided between the window and the polymerizable liquid (e.g., a fluorinated fluid or oil such as a perfluoropolyether oil).

From the foregoing it will be appreciated that, in some embodiments of bottom-up or top down three dimensional fabrication as carried out in the context of the present invention, the growing three dimensional intermediate is fabricated in a layerless manner during the formation of at least one portion thereof, and that same growing three dimensional intermediate is fabricated in a layer-by-layer manner during the formation of at least one other portion thereof. Thus, operating mode may be changed once, or on multiple occasions, between layerless fabrication and layer-by-layer fabrication, as desired by operating conditions such as part geometry.

In preferred embodiments, the intermediate is formed by continuous liquid interface production (CLIP). CLIP is known and described in, for example, PCT Applications Nos. PCT/US2014/015486 (published as U.S. Pat. No. 9,211,678 on Dec. 15, 2015); PCT/US2014/015506 (also published as U.S. Pat. No. 9,205,601 on Dec. 8, 2015), PCT/US2014/015497 (also published as US 2015/0097316, and to publish as U.S. Pat. No. 9,216,546 on Dec. 22, 2015), and in J. Tumbleston, D. Shirvanyants, N. Ermoshkin et al., Continuous liquid interface production of 3D Objects, *Science* 347, 1349-1352 (published online 16 Mar. 2015). In some embodiments, CLIP employs features of a bottom-up three dimensional fabrication as described above, but the the irradiating and/or said advancing steps are carried out while also concurrently maintaining a stable or persistent liquid interface between the growing object and the build surface or window, such as by: (i) continuously maintaining a dead zone of polymerizable liquid in contact with said build surface, and (ii) continuously maintaining a gradient of polymerization zone (such as an active surface) between the dead zone and the solid polymer and in contact with each thereof, the gradient of polymerization zone comprising the first component in partially cured form. In some embodiments of CLIP, the optically transparent member comprises a semipermeable member (e.g., a fluoropolymer), and the continuously maintaining a dead zone is carried out by feeding an inhibitor of polymerization through the optically transparent member, thereby creating a gradient of inhibitor in the dead zone and optionally in at least a portion of the gradient of polymerization zone.

In some embodiments, the stable liquid interface may be achieved by other techniques, such as by providing an immiscible liquid as the build surface between the polymerizable liquid and the optically transparent member, by feeding a lubricant to the build surface (e.g., through an optically transparent member which is semipermeable thereto, and/or serves as a reservoir thereof), etc.

While the dead zone and the gradient of polymerization zone do not have a strict boundary therebetween (in those locations where the two meet), the thickness of the gradient of polymerization zone is in some embodiments at least as great as the thickness of the dead zone. Thus, in some embodiments, the dead zone has a thickness of from 0.01, 0.1, 1, 2, or 10 microns up to 100, 200 or 400 microns, or more, and/or the gradient of polymerization zone and the dead zone together have a thickness of from 1 or 2 microns up to 400, 600, or 1000 microns, or more. Thus the gradient of polymerization zone may be thick or thin depending on the particular process conditions at that time. Where the gradient of polymerization zone is thin, it may also be described as an active surface on the bottom of the growing three-dimensional object, with which monomers can react and continue to form growing polymer chains therewith. In some embodiments, the gradient of polymerization zone, or active surface, is maintained (while polymerizing steps continue) for a time of at least 5, 10, 15, 20 or 30 seconds, up to 5, 10, 15 or 20 minutes or more, or until completion of the three-dimensional product.

Inhibitors, or polymerization inhibitors, for use in the present invention may be in the form of a liquid or a gas. In some embodiments, gas inhibitors are preferred. In some embodiments, liquid inhibitors such as oils or lubricants may be employed. In further embodiments, gas inhibitors which are dissolved in liquids (e.g. oils or lubricants) may be employed. For example, oxygen dissolved in a fluorinated fluid. The specific inhibitor will depend upon the monomer being polymerized and the polymerization reaction. For free radical polymerization monomers, the inhibitor can conveniently be oxygen, which can be provided in the form of a gas such as air, a gas enriched in oxygen (optionally but in some embodiments preferably containing additional inert gases to reduce combustibility thereof), or in some embodiments pure oxygen gas. In alternate embodiments, such as where the monomer is polymerized by photoacid generator initiator, the inhibitor can be a base such as ammonia, trace amines (e.g. methyl amine, ethyl amine, di and trialkyl amines such as dimethyl amine, diethyl amine, trimethyl amine, triethyl amine, etc.), or carbon dioxide, including mixtures or combinations thereof.

The method may further comprise the step of disrupting the gradient of polymerization zone for a time sufficient to form a cleavage line in the three-dimensional object (e.g., at a predetermined desired location for intentional cleavage, or at a location in the object where prevention of cleavage or reduction of cleavage is non-critical), and then reinstating the gradient of polymerization zone (e.g. by pausing, and resuming, the advancing step, increasing, then decreasing, the intensity of irradiation, and combinations thereof).

CLIP may be carried out in different operating modes operating modes (that is, different manners of advancing the carrier and build surface away from one another), including continuous, intermittent, reciprocal, and combinations thereof.

Thus in some embodiments, the advancing step is carried out continuously, at a uniform or variable rate, with either constant or intermittent illumination or exposure of the build area to the light source.

In other embodiments, the advancing step is carried out sequentially in uniform increments (e.g., of from 0.1 or 1 microns, up to 10 or 100 microns, or more) for each step or increment. In some embodiments, the advancing step is carried out sequentially in variable increments (e.g., each increment ranging from 0.1 or 1 microns, up to 10 or 100 microns, or more) for each step or increment. The size of the increment, along with the rate of advancing, will depend in part upon factors such as temperature, pressure, structure of the article being produced (e.g., size, density, complexity, configuration, etc.).

In some embodiments, the rate of advance (whether carried out sequentially or continuously) is from about 0.1 1, or 10 microns per second, up to about to 100, 1,000, or 10,000 microns per second, again depending again depending on factors such as temperature, pressure, structure of the article being produced, intensity of radiation, etc.

In still other embodiments, the carrier is vertically reciprocated with respect to the build surface to enhance or speed the refilling of the build region with the polymerizable liquid. In some embodiments, the vertically reciprocating step, which comprises an upstroke and a downstroke, is carried out with the distance of travel of the upstroke being greater than the distance of travel of the downstroke, to thereby concurrently carry out the advancing step (that is, driving the carrier away from the build plate in the Z dimension) in part or in whole.

In some embodiments, the solidifiable or polymerizable liquid is changed at least once during the method with a subsequent solidifiable or polymerizable liquid (e.g., by switching a "window" or "build surface" and associated reservoir of polymerizable liquid in the apparatus); optionally where the subsequent solidifiable or polymerizable liquid is cross-reactive with each previous solidifiable or polymerizable liquid during the subsequent curing, to form an object having a plurality of structural segments covalently coupled to one another, each structural segment having different structural (e.g., tensile) properties (e.g., a rigid funnel or liquid connector segment, covalently coupled to a flexible pipe or tube segment).

Once the three-dimensional intermediate is formed, it may be removed from the carrier, optionally washed, any supports optionally removed, any other modifications optionally made (cutting, welding, adhesively bonding, joining, grinding, drilling, etc.), and then heated and/or microwave irradiated sufficiently to further cure the resin and form the three dimensional object. Of course, additional modifications may also be made following the heating and/or microwave irradiating step.

Washing may be carried out with any suitable organic or aqueous wash liquid, or combination thereof, including solutions, suspensions, emulsions, microemulsions, etc. Examples of suitable wash liquids include, but are not limited to water, alcohols (e.g., methanol, ethanol, isopropanol, etc.), benzene, toluene, etc. Such wash solutions may optionally contain additional constituents such as surfactants, etc. A currently preferred wash liquid is a 50:50 (volume:volume) solution of water and isopropanol. Wash methods such as those described in U.S. Pat. No. 5,248,456 may be employed and are included therein.

After the intermediate is formed, optionally washed, etc., as described above, it is then heated and/or microwave irradiated to further cure the same. Heating may be active heating (e.g., in an oven, such as an electric, gas, or solar oven), or passive heating (e.g., at ambient temperature). Active heating will generally be more rapid than passive heating and in some embodiments is preferred, but passive heating—such as simply maintaining the intermediate at ambient temperature for a sufficient time to effect further cure—is in some embodiments preferred.

In some embodiments, the heating step is carried out at at least a first (oven) temperature and a second (oven) temperature, with the first temperature greater than ambient temperature, the second temperature greater than the first temperature, and the second temperature less than 300° C. (e.g., with ramped or step-wise increases between ambient temperature and the first temperature, and/or between the first temperature and the second temperature).

For example, the intermediate may be heated in a stepwise manner at a first temperature of about 70° C. to about 150° C., and then at a second temperature of about 150° C. to 200 or 250° C., with the duration of each heating depending on the size, shape, and/or thickness of the intermediate. In another embodiment, the intermediate may be cured by a ramped heating schedule, with the temperature ramped from ambient temperature through a temperature of 70 to 150° C., and up to a final (oven) temperature of 250 or 300° C., at a change in heating rate of 0.5° C. per minute, to 5° C. per minute. (See, e.g., U.S. Pat. No. 4,785,075).

It will be clear to those skilled in the art that the materials described in the current invention will be useful in other additive manufacturing techniques, including ink-jet printer-based methods.

3. Products.

The resins and methods described above are particularly useful for making three-dimensional objects that are strong and stiff, and/or tolerate high temperatures. Examples of products that may be produced by the methods and resins described herein include, but are not limited to, heat shields or housings in automobiles, aircraft, and boats (e.g., "under-the-hood" heat shields or housings), as micro-meteor deflectors for satellites and spacecraft, as pump housings, impellers, injection molds, injection mold cores, healthcare applications where parts must survive high temperature for sterilization, electronics packaging, etc.

In some embodiments, the methods and resins described herein are used to make surgical instruments (for example, retractors, dilators, dissectors and probes, graspers such as forceps, clamps and occluders for blood vessels and other organs, distracters, suction tips, housings for powered devices such as surgical drills and dermatomes, scopes and probes, measurement instruments such as rulers and calipers, handles for cutting instruments such as scalpels and scissors, cataract removal instruments, surgical jigs and guides such as for orthopedic surgery, etc.), surgical instrument trays, mounts and frames for surgical instruments, Intraoral devices (including, but not limited to, surgical guides for dental applications, retainers for corrective orthodontic applications, palatal expanders, tongue thrust instruments, trays for delivery of drugs and bleaching agents, etc.).

In some embodiments of surgical instruments, such as for surgical jigs and guides, and/or imaging jigs and guides, the instruments may be computer-generated custom instruments, or patient-specific instruments. Examples of patient-specific instruments that may be made with the materials and compositions described herein include, but are not limited to, custom jigs for removal of bone tumors; custom jigs and guides for orthopedic surgery, etc. See, e.g., U.S. Pat. Nos. 9,060,788; 9,066,734; 9,066,727; 8,932,299; 8,632,547; 8,591,516; 8,715,289; 8,092,465; US Patent Application Publication Nos. 2014/0025348 and 2012/0239045; and 2011/0106093.

Embodiments of the present invention are explained in greater detail in the following non-limiting examples.

Example 1

Cyanate Ester Dual Cure Resin and Product 57 grams of 1,1'-bis(4-cyanatophenyl)ethane, 1.9 grams of a metal catalyst solution (3000 ppm zinc(II) acetylacetonate hydrate in isobornyl acrylate), 28.5 grams of a commercially available urethane diacrylate (Sartomer PRO13259), 28.5 grams of trimethylolpropane triacrylate, and 1.14 grams of phenylbis(2,4,6-trimethylbenzoyl)phosphine oxide was mixed in a planetary centrifugal mixer to yield a homogeneous resin. This resin was formed into a three dimensional intermediate using continuous liquid interface production (CLIP) in continuous exposure mode, using a 385 nm LED projector with a light intensity of 5 mW/cm$^2$ at a print speed of 100 mm/hour. The formed material was washed and cured for 30 minutes at 140° C., 30 minutes at 160° C., 2 hours at 180° C., 1 hour at 220° C., and 1 hour at 240° C. to yield the desired product. The mechanical properties of dual cured products were evaluated by producing dual cured three dimensional mechanical test samples (e.g., "dog bone" samples) in the foregoing manner. Material properties are given in Table 1 below.

TABLE 1

Materials properties of product

| | |
|---|---|
| Tensile modulus (MPa) | 3200-3500 |
| Ultimate tensile strength (MPa) | 100-110 |
| Elongation (%) | 4-5 |
| Flexural Modulus (MPa) | 3800-4200 |
| Flexural Strength (MPa) | 150-180 |
| Glass transition temperature (DMA, ° C.) | 200-210 |
| Unnotched Izod impact strength (J/m) | 200-400 |
| Heat deflection temperature (° C.) | 198 |

Figure 1:
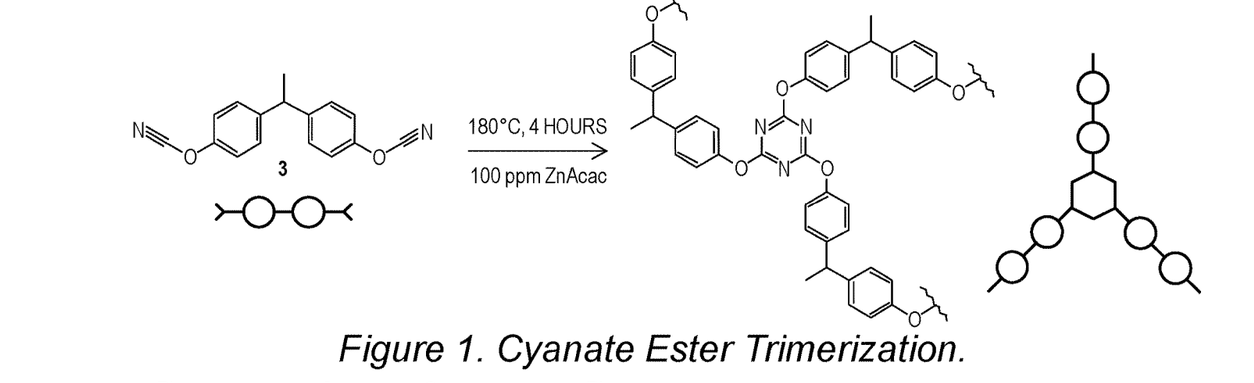
FIG. 1. Non-limiting example of cyanate ester trimerization.
Figure 2:
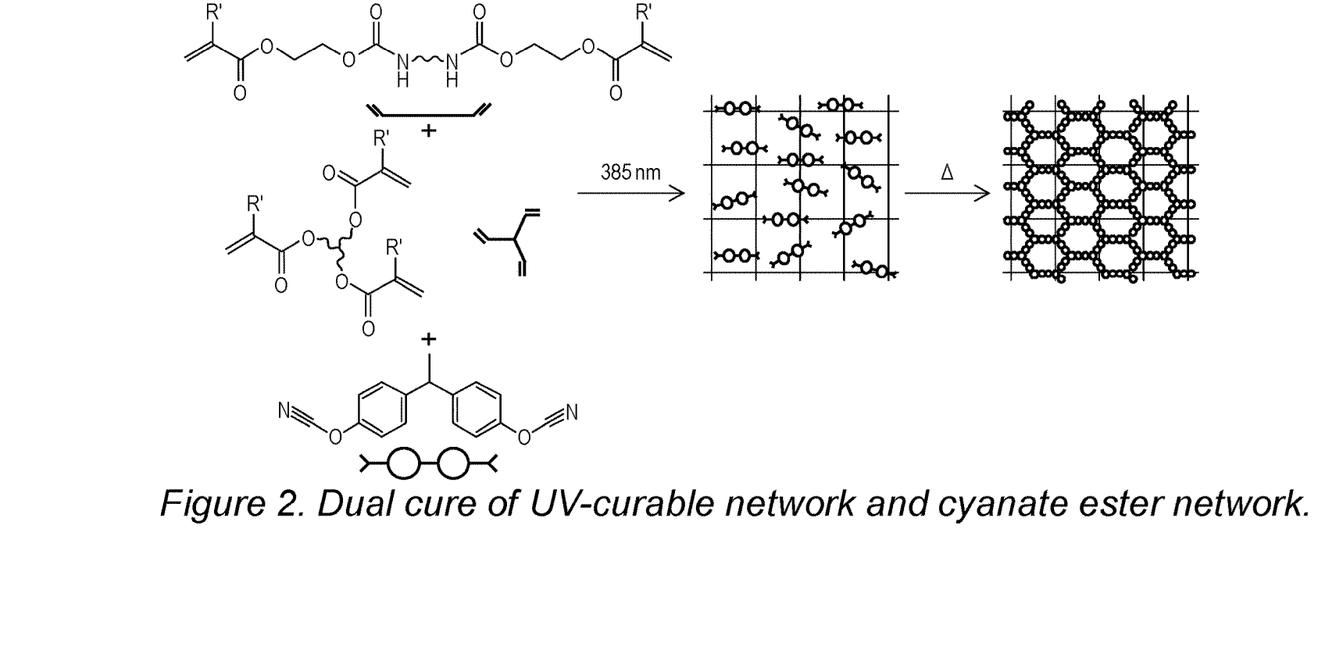
FIG. 2. Non-limiting example dual cure of UV-curable network and cyanate ester network.

Without wishing to be bound to any particular theory of the invention, it is believed that the resins described in this example react as described in FIGS. 1-2 below in the course of forming the dual cured three-dimensional object (where FIG. 2 shows both dual cure reactions, and FIG. 2 is a detail view of the second dual cure reaction shown in Scheme 1).

Figure 3:
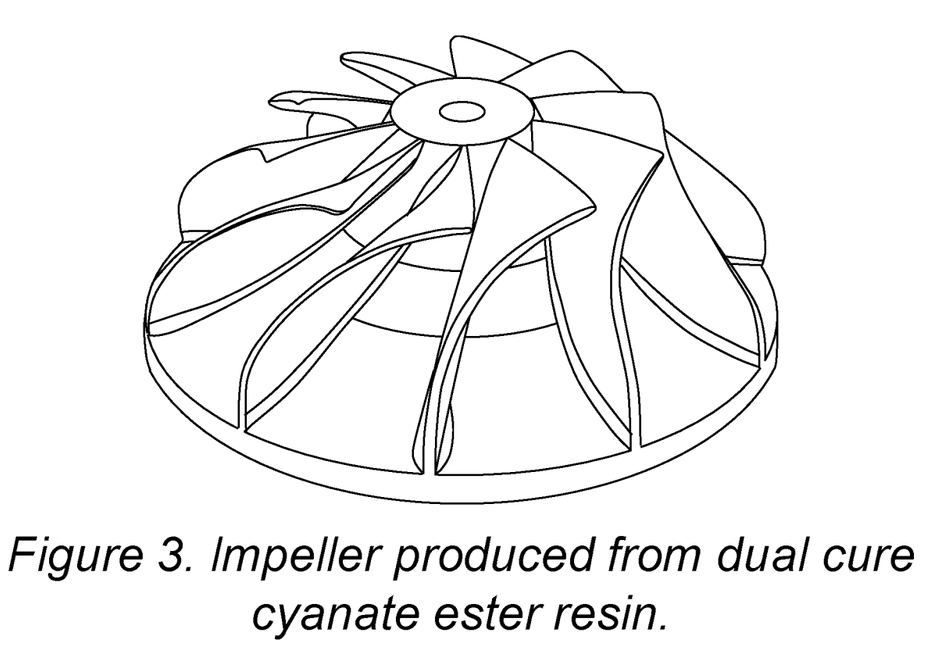
FIG. 3. Impeller produced from a dual cure cyanate ester resin.

An example product (an impeller) produced from a dual cured resin as described above by a process as described above is shown in FIG. 3.

Example 2

CE 1.1 Formulation 48 grams of 1,1'-bis(4-cyanatophenyl)ethane, 2.5 grams of a metal catalyst solution (1500 ppm zinc(II) acetylacetonate hydrate in isobornyl acrylate), 5.3 grams of a commercially available urethane diacrylate (Sartomer CN983), 34.8 grams of trimethylolpropane triacrylate, 8.73 grams of a commercially available diacrylate (Sartomer CN120Z), 1.0 grams of phenylbis(2,4,6-trimethylbenzoyl)phosphine oxide, and 0.1 grams of 2-(3'-tert-butyl-2'-hydroxy-5'-methylphenyl)-5-chlorobenzotriazole was mixed in a planetary centrigugal mixer to yield a homogeneous resin. This resin was formed into a three dimensional intermediate using continuous liquid interface production (CLIP) in continuous exposure mode, using a 385 nm LED projector with a light intensity of 5 mW/cm$^2$ at a speed of 100 mm/hour. The formed material was washed and pre-cured for 90 minutes at 95° C. Following this pre-cure, the part was cured for 60 minutes at 120° C., 120 minutes at 180° C., and 60 minutes at 220° C. to yield the desired product. The mechanical properties of dual cured products produced from such resins were evaluated by producing mechanical test samples in this manner, and are given in Table 2 below.

TABLE 2

Materials properties of product

| | |
|---|---|
| Tensile modulus (MPa) | 3600-4000 |
| Ultimate tensile strength (MPa) | 90-100 |
| Elongation (%) | 3-6 |
| Flexural Modulus (MPa) | |
| Flexural Strength (MPa) | |
| Glass transition temperature (° C.) | 210 |
| Izod impact strength (J/m) | |
| Heat deflection temperature (° C.) | |

Sartomer CN120Z trimethylolpropane triacrylate

Example 3

Resin with AroCy XU371™, and Product

24 grams of 1,1'-bis(4-cyanatophenyl)ethane, 24 grams of a commercial novolac-based cyanate ester (Huntsman XU371), 2.5 grams of a metal catalyst solution (1500 ppm zinc(II) acetylacetonate hydrate in isobornyl acrylate), 25 grams of a commercially available urethane diacrylate (Sartomer CN983), 25 grams of trimethylolpropane triacrylate, and 1.0 grams of phenylbis(2,4,6-trimethylbenzoyl)phosphine oxide was mixed in a planetary centrigugal mixer to yield a homogeneous resin. This resin was formed into a three dimensional intermediate using continuous liquid interface production (CLIP) in continuous exposure mode, using a 385 nm LED projector with a light intensity of 5 mW/cm² at a speed of 100 mm/hour. The formed material was washed and pre-cured for 90 minutes at 95° C. Following this pre-cure, the part was cured for 60 minutes at 120° C., 120 minutes at 180° C., 60 minutes at 220° C., and 60 minutes at 240° C. to yield the desired product. The mechanical properties of products produced from such resins resins were evaluated by producing dual cured mechanical test samples in this manner, and are given in Table 3 below.

TABLE 3

Materials properties of product.

| | |
|---|---|
| Tensile modulus (MPa) | 3900-4100 |
| Ultimate tensile strength (MPa) | 85-95 |
| Elongation (%) | 2-3 |
| Flexural Modulus (MPa) | |
| Flexural Strength (MPa) | |
| Glass transition temperature (° C.) | 240 |
| Izod impact strength (J/m) | |
| Heat deflection temperature (° C.) | |

AroCy 371 Novolac-based cyanate ester

Example 4

Resin with Irgacure 369™ and ITX, and Product 48 grams of 1,1'-bis(4-cyanatophenyl)ethane, 2.5 grams of a metal catalyst solution (1500 ppm zinc(II) acetylacetonate hydrate in isobornyl acrylate), 5.3 grams of a commercially available urethane diacrylate (Sartomer CN983), 34.8 grams of trimethylolpropane triacrylate, 8.73 grams of a commercially available diacrylate (Sartomer CN120Z), 0.9 grams of 2-benzyl-2-dimethylamino-1-(4-morpholinophenyl)-butanone-1, and 0.1 grams of 2-isopropylthioxanthone was mixed in a planetary centrigugal mixer to yield a homogeneous resin. This resin was formed into an intermediate product using continuous liquid interface production (CLIP) in continuous print mode, using a 385 nm LED projector with a light intensity of 5 mW/cm² at a print speed of 100 mm/hour. The formed material was washed and pre-cured for 90 minutes at 95° C. Following this pre-cure, the final product part was cured for 60 minutes at 120° C., 120 minutes at 180° C., and 60 minutes at 220° C. to yield the desired product. The mechanical properties of products so produced were evaluated by producing mechanical test samples from the dual cure resins.

Example 5

Resin without Urethane Acrylate and Product 50 grams of 1,1'-bis(4-cyanatophenyl)ethane, 2.5 grams of a metal catalyst solution (1500 ppm zinc(II) acetylacetonate hydrate in isobornyl acrylate), 6 grams of a commercially available diacrylate (Sartomer CN120Z), 14 grams of a commercially available diacrylate (Sartomer SR601), 20 grams of trimethylolpropane triacrylate, 1 gram of 2-benzyl-2-dimethylamino-1-(4-morpholinophenyl)-butanone-1, and 0.1 grams of Wikoff black dispersion was mixed in a planetary centrigugal mixer to yield a homogeneous resin.

Sartomer CN601

This resin was formed into a three dimensional intermediate using continuous liquid interface production (CLIP) in continuous exposure mode, using a 385 nm LED projector with a light intensity of 5 mW/cm² at a print speed of 100 mm/hour. The formed material was washed and pre-cured for 90 minutes at 95° C. Following this pre-cure, the part was cured for 60 minutes at 120° C., 120 minutes at 180° C., and 60 minutes at 220° C. to yield the desired product. The mechanical properties of parts so produced were evaluated by directly producing mechanical test samples, and are given in Table 4 below.

TABLE 4

Materials properties of product.

| | |
|---|---|
| Tensile modulus (MPa) | 3700-3900 |
| Ultimate tensile strength (MPa) | 90-100 |
| Elongation (%) | 3-5% |
| Flexural Modulus (MPa) | |
| Flexural Strength (MPa) | |

TABLE 4-continued

| Materials properties of product. | |
|---|---|
| Glass transition temperature (° C.) | 215 |
| Izod impact strength (J/m) | |
| Heat deflection temperature (° C.) | |

Example 6

CE 1.2 Formulation 48 grams of 1,1'-bis(4-cyanatophenyl)ethane, 0.004 grams zinc(II) acetylacetonate hydrate, 2.5 grams of isobornyl acrylate, 22.8 grams of trimethylolpropane trimethacrylate, 25.5 grams of a commercially available dimethacrylate (Sartomer CN154), and 1.75 grams of phenylbis(2,4,6-trimethylbenzoyl)phosphine oxide was mixed in a planetary centrigugal mixer to yield a homogeneous resin. This resin was formed into a three dimensional intermediate using continuous liquid interface production (CLIP) in continuous exposure mode, using a 385 nm LED projector with a light intensity of 9 mW/cm$^2$ at a speed of 133 mm/hour. The formed material was washed and pre-cured for 90 minutes at 95° C. Following this pre-cure, the part was cured for 60 minutes at 120° C., 120 minutes at 180° C., and 60 minutes at 220° C. to yield the desired product. The mechanical properties of dual cured products produced from such resins were evaluated by producing mechanical test samples in this manner, and are given in Table 6 below.

TABLE 6

| Materials properties of product | |
|---|---|
| Tensile modulus (MPa) | 4000-4200 |
| Ultimate tensile strength (MPa) | 100-110 |
| Elongation (%) | 2-5 |
| Flexural Modulus (MPa) | |
| Flexural Strength (MPa) | |
| Glass transition temperature (° C.) | 215 |
| Izod impact strength (J/m) | |
| Heat deflection temperature (° C.) | |

Example 7

Cyanate Ester with Prepolymer 1,1'-bis(4-cyanatophenyl)ethane was heated at 120° C. to promote partial polymerization before formulation. The degree of conversion was monitored by infrared spectroscopy and found to be 13% after 16 hours and 27% after 20 hours. Aliquots were removed at these times for formulation, printing, and characterization in the following manner:

48 grams of 1,1'-bis(4-cyanatophenyl)ethane or prepolymer thereof, 0.004 grams zinc(II) acetylacetonate hydrate, 2.5 grams of isobornyl acrylate, 22.8 grams of trimethylolpropane trimethacrylate, 25.5 grams of a commercially available dimethacrylate (Sartomer CN154), and 1.75 grams of phenylbis(2,4,6-trimethylbenzoyl)phosphine oxide was mixed in a planetary centrigugal mixer to yield a homogeneous resin. This resin was formed into a three dimensional intermediate using continuous liquid interface production (CLIP) in continuous exposure mode, using a 385 nm LED projector with a light intensity of 9 mW/cm$^2$ at a speed of 133 mm/hour. The part was cured for 60 minutes at 95° C., 120 minutes at 120° C., 120 minutes at 180° C., and 60 minutes at 220° C. to yield the desired product. The mechanical properties of dual cured products produced from such resins were evaluated by producing mechanical test samples in this manner, and are given in Table 7 below. In addition to the decrease in thermal shrinkage, the amount of resin bleed and part cracking during thermal cure decreased dramatically from 0-27% prepolymer conversion.

TABLE 7

| Materials properties of pre-polymerized CE | | | |
|---|---|---|---|
| | 0% prepol. | 13% prepol. | 27% prepol. |
| Tensile modulus (MPa) | 3800-4000 | 3800-4000 | 3700-3900 |
| Ultimate tensile strength (MPa) | 95-105 | 95-105 | 85-95 |
| Elongation (%) | 3-5 | 3-5 | 3-4 |
| Glass transition temperature (° C., tanD) | 215 | 215 | 215 |
| Thermal shrinkage | 0.4-0.6% | 0.2-0.3% | 0.1-0.2% |

Example 8

Cyanate Ester with Silica Filler 24 grams of 1,1'-bis(4-cyanatophenyl)ethane, 24 grams of silicon dioxide (~99%, 0.5-10 μm (approx. 80% between 1-5 μm), Sigma-Aldrich), 0.004 grams zinc(II) acetylacetonate hydrate, 2.5 grams of isobornyl acrylate, 22.8 grams of trimethylolpropane trimethacrylate, 25.5 grams of a commercially available dimethacrylate (Sartomer CN154), and 1.75 grams of phenylbis(2,4,6-trimethylbenzoyl)phosphine oxide was mixed in a planetary centrigugal mixer to yield a homogeneous resin. This resin was formed into a three dimensional intermediate using continuous liquid interface production (CLIP) in continuous exposure mode, using a 385 nm LED projector with a light intensity of 9 mW/cm$^2$ at a speed of 133 mm/hour. The part was cured for 60 minutes at 95° C., 120 minutes at 120° C., 120 minutes at 180° C., and 60 minutes at 220° C. to yield the desired product. The mechanical properties of dual cured products produced from such resins were evaluated by producing mechanical test samples in this manner, and are given in Table 8 below.

TABLE 8

| Materials properties of product | |
|---|---|
| Modulus (before post-cure, MPa) | 475 |
| Tensile modulus (after post-cure, MPa) | 5300-5700 |
| Ultimate tensile strength (MPa) | 80-90 |
| Elongation (%) | 1-3 |
| Glass transition temperature (° C., tanD) | 200 |

The foregoing is illustrative of the present invention, and is not to be construed as limiting thereof. The invention is defined by the following claims, with equivalents of the claims to be included therein.

We claim:

1. A method of forming a three-dimensional object, comprising:
   (a) providing a cyanate ester dual cure resin;
   (b) forming, by additive manufacturing, a three-dimensional intermediate from said resin, where said intermediate has the shape of, or a shape to be imparted to, said three-dimensional object, and where said resin is solidified by exposure to light;
   (c) optionally washing the three-dimensional intermediate, and then (d) heating and/or microwave irradiating said three-dimensional intermediate sufficiently to further cure said resin- and form said three-dimensional object;
wherein said cyanate ester dual cure resin comprises:
(i) a photoinitiator;
(ii) monomers and/or prepolymers that are polymerizable by exposure to actinic radiation or light;
(iii) optionally, a light absorbing pigment or dye;
(iv) optionally, a metal catalyst;
(v) optionally, a nucleophilic co-catalyst;
(vi) at least one cyanate ester compound, and/or a prepolymer thereof, each said cyanate ester compound independently having a structure of Formula I;

(I)

wherein m is 2, 3, 4, or 5, and R is an aromatic or aliphatic group;
(vii) optionally a diluent;
(viii) a toughener; and
(ix) an epoxy co-monomer and/or a co-prepolymer.

2. The method of claim 1, wherein R is a phenyl group.

3. The method of claim 1, wherein R is a phenyl, biphenyl, naphthyl, bis(phenyl)methane, bis(phenyl)ethane, bis(phenyl)propane, or bis(phenyl)dicyclopentadiene group, or a phenol formaldehyde resin.

4. The method of claim 1, wherein said cyanate ester compound is selected from the group consisting of: bis(4-cyanathophenyl) methane; 1,1-bis(4-cyanatophenyl)ethane; 2,2-bis(4-cyanatophenyl) propane; bis(4-cyanatophenyl) ether; tetramethyl-1,4-dicyanatobenzene; cyanated novolacs produced by reacting a novolac with cyanogen halide; cyanated bisphenol polycarbonate oligomers produced by reacting a bisphenol polycarbonate oligomer with cyanogen halide; and mixtures thereof.

5. The method of claim 1, wherein said metal catalyst is a metal salt of an organic acid of at least one metal selected from the group consisting of copper, zinc, lead, nickel, iron, tin and cobalt.

6. The method of claim 1, wherein said metal catalyst is present in a range of 10 or 30 to 600, 1,000, or 10,000 microequivalents of said metal catalyst as compared to the total weight of said at least one cyanate ester, epoxy monomer or prepolymer thereof.

7. The method of claim 1, wherein said nucleophilic co-catalyst is an alkylphenol or imidazole present in the amount of 1 or 5 to 20 or 500 milliequivalents of epoxy equivalent weight.

8. The method of claim 1, wherein said nucleophilic co-catalyst is selected from the group consisting of nonylphenol, dodecylphenol, o-cresol, 2-sec.butylphenol and 2,6 dinonylphenol, 2-methylimidazole, 2-undecylimidazole, 2-heptadecyl imidazole, 2-phenylimidazole, 2-ethyl 4-methylimidazole, 1-benzyl-2-methylimidazole, 1-propyl-2-methylimidazole, 1-cyanoethyl-2-methylimidazole, 1-cyanoethyl-2-ethyl-4-methylimidazole, 1-cyanoethyl-2-undecylimidazole, 1-cyanoethyl-2-phenylimidazole, or 1-guanaminoethyl-2-methylimidazole, or water.

9. The method of claim 1, wherein said nucleophilic co-catalyst is a component of the monomers and/or prepolymers, present in the amount of about 10 or 40 to about 400 or 800 milliequivalents of active hydrogen per equivalent of cyanate group.

10. The method of claim 1, wherein said monomers and/or prepolymers polymerizable by exposure to actinic radiation or light comprise reactive end groups selected from the group consisting of acrylates, methacrylates, α-olefins, N-vinyls, acrylamides, methacrylamides, epoxides, thiols, 1,3-dienes, and maleimides.

11. The method of claim 1, wherein said light absorbing pigment or dye is:
(i) titanium dioxide,
(ii) carbon black, and/or
(iii) an organic ultraviolet light absorber.

12. The method of claim 1, wherein said resin comprises at least one cyanate ester prepolymer.

13. The method of claim 12, wherein said cyanate ester prepolymer comprises the reaction product of cyanate ester monomers and epoxy monomers and has a molecular weight of 100 grams/mole to 8,000 grams/mole.

14. The method of claim 1, wherein said toughener comprises a core-shell rubber.

15. The method of claim 1, wherein said resin comprises:
(i) from 0.1 to 4 percent by weight of said photoinitiator;
(ii) from 25 to 60 percent by weight of said monomers and/or prepolymers that are polymerizable by exposure to actinic radiation or light;
(iii) from 0.1 to 2 percent by weight of said light absorbing pigment or dye when present;
(iv) from 0.001 to 0.1 percent by weight of said metal catalyst when present;
(v) from 0.01 to 5 percent by weight of said nucleophilic co-catalyst when present;
(vi) from 10 to 60 percent by weight of said cyanate ester compound and/or prepolymer thereof;
(vii) from 1 to 40 percent by weight of said diluent when present;
(viii) from 1 to 30 percent by weight of said toughener; and
(ix) from 0.1 to 49 percent by weight of said epoxy co-monomer and/or co-prepolymer.

16. The method of claim 1, wherein said forming step is carried out by bottom-up or top-down three-dimensional fabrication.

17. The method of claim 1, wherein said forming step is carried out:
(i) by either bottom-up three dimensional fabrication between a carrier and a build surface or top-down three dimensional fabrication between a carrier and a fill level, the fill level optionally defined by a build surface;
(ii) optionally with a stationary build surface;
(iii) optionally while maintaining the resin in liquid contact with both the intermediate object and the build surface; and
(iv) optionally with said forming step carried out in a layerless manner,
each during the formation of at least a portion of the three dimensional intermediate.

18. The method of claim 1, wherein said heating step is carried out at at least a first temperature and a second temperature,
with said first temperature greater than ambient temperature, said second temperature greater than said first temperature, and said second temperature less than 300° C.

19. The method of claim 1, said resin further comprising a stabilizer, such as an acid having a pKa of 2 or less, included in said composition in an amount of from 0.001 or 0.01 percent by weight to 0.5 or 1 percent by weight.

* * * * *

UNITED STATES PATENT AND TRADEMARK OFFICE
CERTIFICATE OF CORRECTION

PATENT NO. : 11,090,859 B2  
APPLICATION NO. : 16/576862  
DATED : August 17, 2021  
INVENTOR(S) : Menyo et al.

Page 1 of 1

It is certified that error appears in the above-identified patent and that said Letters Patent is hereby corrected as shown below:

On the Title Page (56) References Cited, OTHER PUBLICATIONS: Please add -- European Office Action corresponding to EP 16766748.4; dated Feb. 3, 2021 (6 pages) --

In the Specification

Column 8, Line 31: Please correct "NANOPOX™" to read -- NANOPOX®™ --

In the Claims

Column 21, Line 3, Claim 1: Please correct "resin- and" to read -- resin and --

Signed and Sealed this  
Fourteenth Day of December, 2021

Drew Hirshfeld  
*Performing the Functions and Duties of the*  
*Under Secretary of Commerce for Intellectual Property and*  
*Director of the United States Patent and Trademark Office*